United States Patent [19]
Johnston et al.

[11] Patent Number: 5,376,697
[45] Date of Patent: Dec. 27, 1994

[54] DRAG REDUCERS FOR FLOWING HYDROCARBONS

[75] Inventors: Ray L. Johnston; Larry G. Fry, both of Ponco City, Okla.

[73] Assignee: Conoco Inc., Ponca City, Okla.

[21] Appl. No.: 81,495

[22] Filed: Jun. 21, 1993

[51] Int. Cl.⁵ .................. B05D 5/08; F17D 1/16
[52] U.S. Cl. .................. 523/175; 524/394; 524/444; 524/445; 524/451; 137/13
[58] Field of Search .............. 523/175; 524/394, 445, 524/444, 451; 137/13; 526/348

[56] References Cited

U.S. PATENT DOCUMENTS

| | | | |
|---|---|---|---|
| 3,884,252 | 5/1975 | Kruka | 137/13 |
| 4,147,677 | 4/1979 | Lundberg et al. | 260/235 A |
| 4,212,312 | 7/1980 | Titus | 137/13 |
| 4,263,926 | 4/1981 | Drake et al. | 137/13 |
| 4,340,076 | 7/1982 | Weitzen | 137/13 |
| 4,433,123 | 2/1984 | Mack | 526/139 |
| 4,584,244 | 4/1986 | Fenton | 428/407 |
| 4,720,397 | 1/1988 | O'Mara et al. | 427/180 |
| 4,771,799 | 9/1988 | Baxter et al. | 132/17 |
| 4,826,728 | 5/1989 | O'Mara et al. | 428/407 |
| 4,837,249 | 6/1989 | O'Mara et al. | 523/175 |
| 5,165,440 | 11/1992 | Johnston | 137/13 |

Primary Examiner—Veronica P. Hoke
Assistant Examiner—LaVonda R. DeWitt
Attorney, Agent, or Firm—William D. Hall

[57] ABSTRACT

The present invention provides a process for precipitating a polyolefin from solution. The present invention also provides a polyolefin paste having drag reducing characteristics when dissolved in a flowing hydrocarbon stream and a method for making the drag reducing paste. Finally, the present invention provides a slurried drag reducer prepared from the paste for use in flowing hydrocarbon streams.

23 Claims, 1 Drawing Sheet

DRAG REDUCERS FOR FLOWING HYDROCARBONS

BACKGROUND AND SUMMARY OF THE INVENTION

Summary of the Invention

The present invention provides an alpha-olefin polymer or copolymer paste for reducing drag in the transportation of hydrocarbons through conduits and a method for preparing the same. Further, the present invention provides a drag reducer comprising a slurried alpha-olefin polymer or copolymer. The present invention also provides a process for precipitating an alpha-olefin polymer or copolymer which has been formed by solution polymerization.

Background of the Invention

The preparation of alpha-olefin polymers or copolymers for use as drag reducers in the transportation of hydrocarbons through conduits is well known. For example, U.S. Pat. No. 4,584,244 describes the preparation of a drag reducer having an increased dissolution rate in flowing hydrocarbons. The process described includes the steps of grinding the polymer to a powder in the presence of a coating agent in order to preclude clumping. Additionally, U.S. Pat. Nos. 4,771,799 and 5,165,440 discuss the use of a drag reducing polymer solution, commonly referred to as a gel, which is formed into threads or filaments in order to increase the rate of polymer gel dissolution when placed into a hydrocarbon stream.

While the foregoing approaches successfully achieve their goals, each method has inherent handling problems. For example, when using a powdered drag reducer, special equipment is required to place the polymer powder into a pipeline and to ensure complete dissolution of polymer within the hydrocarbon stream. The gel or solution drag reducers of U.S. Pat. Nos. 4,771,799 and 5,168,440 are shown to dissolve more readily. However, the introduction of the drag reducer gel to the hydrocarbon stream according to these disclosures necessitates the use of special equipment and pressurized containers. Thus, it would be desirable to provide a drag reducer in a form which allows for rapid dissolution of the polymer and does not require transportation of solvents or high pressures.

It is an object of the present invention to provide an alpha-olefin polymer or copolymer paste capable of providing a drag reducer for use in flowing hydrocarbons which is easier to handle. Other objects will become apparent to those skilled in the art in view of the following disclosure.

BRIEF DESCRIPTION OF THE INVENTION

In general, the present invention provides a process for precipitating an alpha-olefin polymer or copolymer (hereinafter collectively referred to as "polyolefin") which has been formed by solution polymerization in a nonpolar solvent. The polymers and copolymers of interest are those suitable for reducing drag in flowing hydrocarbon streams. In general, these polymers will have a molecular weight of more than 1,000,000, further defined by an inherent viscosity of about 12–18 dL/g. The inherent viscosity ($\eta_{inh}$) of a polymer may be determined by the use of a Cannon-Ubbelohde four bulb shear dilution viscometer (0.1 g polymer /100 ml toluene at 25° C.). Inherent viscosities are calculated for each of the four bulbs. The viscosities are then plotted as a function of shear rate. The plot is then used to determine the inherent viscosity at a shear rate of 300 sec$^{-1}$.

The process utilizes an apparatus designed for dissolving gel polyolefin drag reducers and is more completely described in U.S. Pat. No. 5,165,440. The apparatus has first and second elongated zones. The first elongated zone contains a plurality of openings along its length and each opening contains a plurality of small passageways. The second elongated zone is spaced apart from and surrounds the first elongated zone to form an annulus and is sealed to each end of the first elongated zone.

Precipitation of the polyolefin requires an extracting agent which is miscible with respect to the nonpolar polymerization solvent and the flowing hydrocarbons and is a nonsolvent with respect to the polyolefin. The extracting agent is introduced into one end of the first elongated zone and the gel-like solution of nonpolar solvent and polyolefin is passed into the second elongated zone. The gel-like solution is formed into strands as it passes from the second elongated zone into the first elongated zone through the plurality of openings. The formation of strands increases the surface area of the polyolefin gel exposed to the extracting agent, aiding in the extraction of the nonpolar solvent from the polymer matrix. Upon extraction of the solvent, the polyolefin precipitates as a stranded material.

The present invention further provides a process for preparing a drag reducing polyolefin paste. The process for forming the paste comprises the steps of grinding a polyolefin obtained from any of the methods known to the art and combining the ground polymer with a polar organic compound. The method of choice for preparing the polymer will determine the amount, if any, of grinding necessary in order to provide a polyolefin of the appropriate particle size. The grinding process requires the presence of a coating agent or a polar organic compound and preferably will be performed under cryogenic conditions. Following grinding, the paste is formed by adding the ground polyolefin to a polar organic compound.

Thus, the present invention provides a polyolefin paste having drag reducing characteristics when dissolved in a flowing hydrocarbon stream. The paste comprises a high molecular weight polyolefin having an inherent viscosity number of about 12–18 dL/g, mixed with a polar organic compound. The polar organic compound must be a nonsolvent with respect to the polyolefin and must also be miscible with the flowing hydrocarbon stream in which drag reduction is desired.

Finally, the present invention provides a polyolefin slurry having drag reducing characteristics. The desired slurry may be added to a hydrocarbon stream without the use of special equipment. The slurry is prepared from a polyolefin paste as described in this invention. As described above, the polyolefin is ground to a desired size and formed into a paste. Adding the paste to water forms a drag reducing slurry, which may be added to a flowing hydrocarbon stream without the use of special equipment.

DESCRIPTION OF THE DRAWING

The FIGURE is a schematic drawing of the apparatus for precipitating a solution polymerized polyolefin.

DETAILED DISCLOSURE OF THE INVENTION

A. Precipitating the Polyolefin

Figure 1:
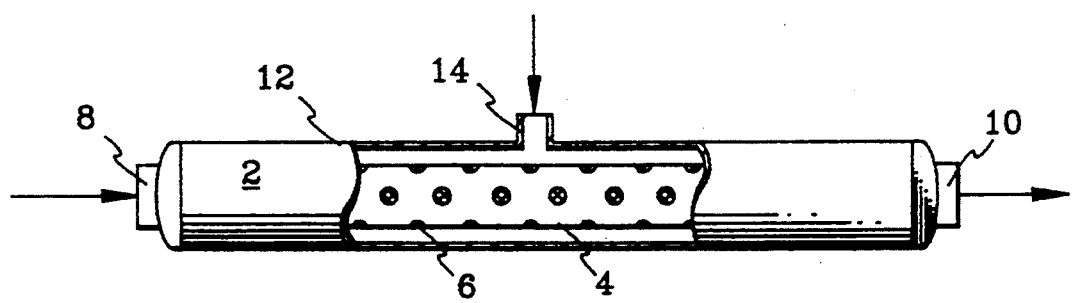

The apparatus depicted in the accompanying drawing illustrates a preferred embodiment for use in the process of precipitating a drag reducing polyolefin from a gel-like solution. The disclosure of U.S. Pat. No. 5,165,440, hereby incorporated by reference, describes the present apparatus, in combination with two additional apparatus, which provide a means for forming a viscous drag reducing polyolefin into threads or filaments to aid in the dissolution of the polymer.

We have now discovered that the apparatus, identified in the drawing with the numeral 2, is equally useful for precipitating a solid polyolefin polymer from a nonpolar organic solvent. Referring to the drawing, apparatus 2 comprises an inner pipe 4, perforated with a number of holes 6 and wrapped with wire mesh (not shown). An outer pipe 12 covers the perforated portion of inner pipe 4 and is sealed to both ends of pipe 4 to provide an annulus between the two pipes. Pipe 4 has an inlet 8 and an outlet 10 which are in fluid communication. Outer pipe 12 has an inlet 14 which is in fluid communication with the interior of pipe 4 through holes 6.

The process for precipitating a drag reducing polyolefin from a gel-like solution of polyolefin and nonpolar solvent (polyolefin gel) comprises the steps of:

A) passing an extracting agent which is miscible with the nonpolar solvent containing the polyolefin through inlet 8 into pipe 4;
B) passing the polyolefin gel through inlet 14 into outer pipe 12;
C) passing the polyolefin gel from the annulus between pipe 12 and pipe 4, through holes 6 into the interior of pipe 4 to form strands of polyolefin gel in pipe 4 as the polyolefin gel passes through the wire mesh;
D) contacting the polyolefin gel with the miscible extracting agent within pipe 4 to permit extraction of the solvent by the extracting agent, resulting in the precipitation of the polyolefin from solution within pipe 4;
E) passing the precipitated polyolefin and extracting agent/nonpolar solvent out of apparatus 2 through outlet 10;
F) allowing the extracting agent to remain in contact with the polyolefin strands for a sufficient period of time to insure complete precipitation of the polyolefin;
G) separating and recovering the precipitated polyolefin from the solution of extracting agent and nonpolar solvent.

In a preferred embodiment, the extracting agent is recovered from the solution of extracting agent and nonpolar solvent and the distilled extracting agent and nonpolar solvent is reused.

In the process of precipitating the polyolefin, the separation of the polyolefin gel into strands increases the surface area of the gel and promotes the extraction of the nonpolar solvent. The dimensions of the strands will depend upon the size of the mesh and the flow rates of both the polyolefin gel and the polar compound. As the polar compound contacts the gel solution, the nonpolar solvent is extracted from the polymer matrix. Upon removal of the nonpolar solvent from the polymer matrix, precipitation of the polyolefin as solid strands occurs within apparatus 2. The flow of the nonpolar solvent/polar compound solution through pipe 4 carries the precipitated polyolefin from apparatus 2 through outlet 10. The materials are contacted until polymer precipitation is complete.

The exiting nonpolar solvent/polar compound solution and polyolefin can be passed into a holding tank (not shown) where the extraction process is continued until completion. The holding tank may be any convenient structure which is suitable for holding organic solvents. The tank may be provided with stirring or agitation means or may allow for manual stirring of the polyolefin strands.

The extraction process continues within apparatus 2, a holding tank or other appropriate container until precipitation is considered to be complete as evidenced by the polyolefin strands changing from a grayish to a whitish color. Depending on variables such as strand size, polymer content of the polyolefin gel, temperature and the ratio of extracting agent to polyolefin gel, the full precipitation process may require up to seventy two hours but normally can be completed in approximately 24 hours. If necessary, the extraction process may be aided by agitation of the strands. Although traces of nonpolar solvent may remain within the strands, precipitation is considered to be complete when the color change occurs. The precipitated polyolefin is removed from the apparatus 2 or the holding tank by filtration or any other conventional method known to those skilled in the art. Following removal of the precipitated polyolefin, the mixture of miscible extracting agent and nonpolar solvent may be separated by distillation and both components may be reused.

Miscible extracting agents suitable for use in the present invention are polar organic compounds containing five carbons or less selected from the group of consisting of aldehydes, ketones, alcohols and carboxylic acids. The preferred extracting agents are ethanol, methanol and propanol. It is prefered that the extracting agent be used in as high a ratio to polyolefin nonpolar solvent as possible, but at least a 2:1 ratio of extracting agent to solvent should be used.

B. The Drag Reducing Paste

In the process of preparing a drag reducing paste, a polyolefin is prepared by any of the known methods including bulk polymerization, suspension polymerization, gas phase polymerization and solution polymerization. Once prepared, the polyolefin is ground to a desired size, followed by mixing with a polar solvent to form the paste.

A preferred process for preparing the drag reducing paste has the following steps:

A) solution polymerizing polyolefins in a nonpolar organic solvent to form a gel-like solution (polyolefin gel) followed by precipitating the polyolefin from solution by;
B) passing an extracting agent which is miscible with the nonpolar solvent containing the polyolefin through inlet 8 into pipe 4;
C) passing the polyolefin gel through inlet 14 into outer pipe 12;
D) passing the polyolefin gel from the annulus between pipe 12 and pipe 4, through holes 6 into the interior of pipe 4 to form strands of polyolefin gel in pipe 4 as the polyolefin gel passes through the wire mesh;
E) contacting the polyolefin gel with the miscible extracting agent within pipe 4 to permit extraction of the solvent by the extracting agent, resulting in the precipitation of the polyolefin from solution within pipe 4;

F) passing the precipitated polyolefin and extracting agent/nonpolar solvent out of apparatus 2 through outlet 10;

G) separating and recovering the precipitated polyolefin from the solution of extracting agent and nonpolar solvent;

H) recovering the extracting agent from the solution of extracting agent and nonpolar solvent and reusing the distilled extracting agent and nonpolar solvent;

I) grinding the precipitated polyolefin to a desired size;

J) mixing the ground polyolefin with a polar organic compound to form a paste.

Preferably, the grinding step will be carried out in a cryogrinding unit after the polyolefin has been chilled to below the polymer glass transition temperature. In the case of drag reducing polyolefins this temperature is about $-200°$ F. ($-130°$ C.). In one preferred embodiment, the polyolefin will be treated with a coating agent and dried prior to grinding in order to prevent the reagglomeration of the particles. Typically, the coating agent will be chosen from the group of consisting of alumina, talc, clays and metal stearates.

In an alternative preferred process, the requirement of a coating agent may be avoided. In this process, the polyolefin is not dried prior to grinding. Thus, the miscible extracting agent remains in the polyolefin and the step of grinding is carried out in the presence of the extracting agent. It is believed that the presence of the extracting agent precludes the reagglomeration of the polyolefin particles after the grinding step. Further, the presence of the extracting agent may aid in the formation of the paste. The preferred extracting agents are organic polar solvents containing five carbons or less selected from the group consisting of aldehydes, ketones, alcohols and carboxylic acids. Of these, alcohols are the most preferred.

When dissolved in a flowing hydrocarbon stream the polyolefin paste of the present invention will significantly reduce the drag of the flowing hydrocarbons. The paste of the present invention comprises a high molecular weight polyolefin having an inherent viscosity number of about 12-18 dL/g and a polar organic compound. The polar organic compound is a nonsolvent with respect to the polyolefin and is miscible with the flowing hydrocarbon stream in which drag reduction is desired. Normally, the paste will comprise from about 40% to about 75% polyolefin by weight, with the balance of the paste provided by a polar organic compound having five carbons or less selected from the group consisting of aldehydes, ketones, alcohols and carboxylic acids.

The drag reducing paste of the present invention provides several advantages over the drag reducers currently available. These advantages include: 1) longer shelf life than a powder; 2) a faster rate of dissolution in the hydrocarbon stream, due to the use of the polar organic compound which eliminates clumps found in the powder and precludes the formation of clumps in the paste; 3) a relatively high concentration of drag reducing polymer which reduces storage and transportation costs; 4) the ability to directly inject the paste into the hydrocarbon stream without the use of pressurized vessels or dies as required by current drag reducing gels; and 5) for even easier injection into the hydrocarbon stream, the paste may be converted to a slurry by the simple addition of water.

C. The Drag Reducing Slurry

The present invention also provides a polyolefin slurry having drag reducing characteristics. A preferred slurry will be the product of a process of solution polymerizing alpha-olefins in a nonpolar organic solvent to form a polyolefin gel-like solution (polyolefin gel) followed by precipitating the polyolefin from solution by:

A) passing an extracting agent which is miscible with the nonpolar solvent containing the polyolefin through inlet 8 into pipe 4;

B) passing the polyolefin gel through inlet 14 into outer pipe 12;

C) passing the polyolefin gel from the annulus between pipe 12 and pipe 4, through holes 6 into the interior of pipe 4 to form strands of polyolefin gel in pipe 4 as the polyolefin gel passes through the wire mesh;

D) contacting the polyolefin gel with the miscible extracting agent within pipe 4 to permit extraction of the solvent by the extracting agent, resulting in the precipitation of the polyolefin from solution within pipe 4;

E) passing the precipitated polyolefin and extracting agent/nonpolar solvent out of apparatus 2 through outlet 10;

F) separating and recovering the precipitated polyolefin from the solution of extracting agent and nonpolar solvent;

G) grinding the precipitated polyolefin to a desired size;

H) mixing the ground polyolefin with a polar solvent to form a paste

I) adding the paste to water to form a slurry.

In a preferred embodiment, the extracting agent and nonpolar solvent are recovered and recycled. The liquids may be recovered by filtration from the polyolefin followed by separation of the liquid components by distillation.

The use of a paste as the precursor for the slurry provides a marked improvement over attempts to make a slurried drag reducer directly from a powder. Frequently, attempts to make a slurried drag reducer from a powder have failed primarily due to the tendency of the powder to clump, even after treatment with a coating agent. This clumping may be due to the nonuniform distribution of the coating agent or the presence of residual polymerization solvent. These powder clumps inhibit the dispersion of the powder in water precluding the formation of a uniform slurry.

Normally, the paste used in forming the slurry will comprise from 40-75% polyolefins by weight. Finally, if required the slurry may contain surfactants, defoamers, thickeners and/or biocide agents. The resulting slurry is suitable for direct injection into hydrocarbon conduits as a drag reducer without necessitating the use of special equipment or high pressures.

The following examples are provided to more concretely describe the present invention and not to limit the present invention. All parts and percentages are by weight unless otherwise specified.

EXAMPLE 1

A test to demonstrate the preparation of a drag reducing paste by precipitation of polyolefin from a solution polymerized drag reducer was carried out using an apparatus similar to that shown in FIG. 1. The apparatus consisted of an inner ½-inch Schedule 80 pipe, and an outer 1 ½-inch Schedule 160 pipe, each pipe was 3 feet in length. The ½-inch pipe contained 240 ⅛-inch holes covered with 40 mesh wire. A commercial polymeric drag reducer solution, CDR ® 102M Flow Improver, trademark of and sold by Conoco Specialty Products, Inc., was introduced into the outer pipe at a rate of 0.04 gallon/minute and isopropyl alcohol was introduced to the inner pipe at a rate of 0.4 gallons/minute. The mixture leaving the apparatus consisted of precipitated polyolefin in the form of small stranded (about 1-inch long) pieces entrained in the alcohol/hydrocarbon fluid. The skin of the stranded pieces were white colored indicating the extraction of the drag reducer solvent from that part of the polyolefin solution. The mixture was allowed to flow into 55-gallon containers where the mixture was periodically stirred and allowed to remain for three days. After three days, the stranded pieces were totally white indicating full extraction of the drag reducer solvent, leaving nearly pure polymer pieces. The polymer pieces were removed from the mixture by filtration. A small amount of alumina, about 2% by weight, was mixed into the "wet" polyolefin pieces (to reduce tendency for stickiness or agglomeration of the pieces after drying). The polyolefin pieces were then placed into an oven at about 160° F. for drying. The resulting dry polyolefin pieces were then removed from the oven and alumina at about 20% by weight was added. The alumina coated polyolefin was then cryoground to produce a fine drag reducing powder. Following grinding, the powder was added to isopropyl alcohol at a ratio of 19 parts powder to 9 parts of isopropyl alcohol, by weight. The powder entrained easily into the alcohol and made a smooth paste.

EXAMPLE 2

Following filtration, the polymer pieces of Example 1, still wet with the alcohol mixture, are fed into a cryogenic cooler and grinding system. The polymer pieces and frozen alcohol are reduced to a fine sized powder. Upon warming the powder becomes a wet powder, wherein the polymer particles do not reheal or agglomerate. This wet powder is screw conveyed and additional isopropanol is added to the wet powder to make a paste.

EXAMPLE 3

The following describes the formation of a slurry. A powdered drag reducer was added (following storage and transportation) to a stirred container of water which also contained a small amount of surfactant. The powder dispersed nearly completely into the water to form a slurry, but left numerous small lumps of non-dispersed or agglomerated powder (about 1 mm to 1 cm in diameter) in the slurry.

EXAMPLE 4

The powder used in Example 3 was formed into a paste by addition to isopropanol according to the previously described procedures. The paste was then added to a stirred container of water which also contained a small amount of surfactant in order to provide a directly comparable example. The paste quickly and readily dispersed into the water, forming a suspended slurry with no clumps or agglomerates of polyolefin.

Other embodiments of the present invention will be apparent to those skilled in the art from a consideration of this specification or practice of the invention disclosed herein. It is intended that the specification be considered as only exemplary, with the true scope and spirit of the invention being indicated by the following claims.

We claim:

1. A process for precipitating a polyolefin having drag reducing characteristics which has been solution polymerized in a nonpolar solvent comprising the steps of:
    A) introducing an extracting agent miscible with the nonpolar solvent into one end of a first elongated zone containing a plurality of openings along the length of such zone, each opening containing a plurality of small passageways;
    B) passing the nonpolar solvent containing said polyolefin into a second elongated zone surrounding and spaced from the first elongated zone to form an annulus, said second zone being sealed to the first elongated zone at each end thereof;
    C) passing said nonpolar solvent containing said polyolefin through said plurality of openings to form strands of nonpolar solvent containing polyolefin;
    D) contacting said strands of nonpolar solvent containing said polyolefin with said extracting agent within said first elongated zone and extracting said nonpolar solvent from the polyolefin, to precipitate said polyolefin from solution;
    E) passing said precipitated polyolefin, the mixture of miscible extracting agent and nonpolar solvent and any unprecipitated polyolefin out of said first elongated zone;
    F) allowing said extracting agent to remain in contact with said unprecipitated polyolefin for a sufficient period of time to insure precipitation of substantially all of said polyolefin;
    G) separating and recovering said precipitated polyolefin from the mixture of miscible extracting agent and nonpolar solvent.

2. The process of claim 1, wherein said miscible extracting agent is a polar organic compound containing five carbons or less selected from the group consisting of aldehydes, ketones, alcohols and carboxylic acids.

3. The process of claim 1, wherein said miscible extracting agent is an alcohol.

4. The process of claim 1, having the additional step of recovering said extracting agent from said nonpolar solvent and recycling said extracting agent and said nonpolar solvent.

5. A process for preparing a polyolefin paste having drag reducing characteristics comprising:
    A) solution polymerizing an alpha-olefin in a nonpolar organic solvent to form a polyolefin solution;
    B) introducing an extracting agent miscible with said nonpolar organic solvent into one end of an inner elongated zone, said inner zone containing a plurality of openings along the length of such zone, each opening containing a plurality of small passageways which are in fluid communication with an outer elongated zone;
    C) passing said polyolefin solution into said outer elongated zone surrounding and spaced form said inner elongated zone to form an annulus, said outer zone being sealed to the inner elongated zone at each end thereof;
    D) passing said polyolefin solution from said outer elongated zone through the small passageways of said inner zone to form strands of polymer in said inner elongated zone;

E) contacting the polyolefin solution with said extracting agent within said inner elongated zone and precipitating said polyolefin form solution;

F) recovering said precipitated polyolefin

G) grinding said polyolefin to a desired size;

H) mixing said ground polyolefin with a polar organic solvent.

6. The process of claim 5, wherein said precipitated polyolefin is chilled below the glass transition point and then cryoground.

7. The process of claim 6, wherein said precipitated polyolefin is ground in the presence of a coating agent.

8. The process of claim 7, wherein said coating agent is selected from the group consisting of alumina, talc, clays and metal stearates.

9. The process of claim 5, wherein said extracting agent is a polar organic compound containing five carbons or less selected from the group consisting of aldehydes, ketones, alcohols and carboxylic acids.

10. The process of claim 5, wherein said extracting agent is an alcohol.

11. The process of claim 5, wherein said extracting agent is separated from said nonpolar solvent and said extracting agent and said nonpolar solvent are reused.

12. The process of claim 5, wherein grinding of said precipitated polyolefin is carried out in the presence of said extracting agent.

13. The process of claim 5, wherein said polar organic solvent contains five carbons or less and is selected from the group consisting of aldehydes, ketones, alcohols and carboxylic acids.

14. The process of claim 5, wherein said polar organic compound is an alcohol.

15. The process of claim 5, including the step of drying the precipitant to remove substantially all liquids.

16. A polyolefin paste having drag reducing characteristics when dissolved in a flowing hydrocarbon stream comprising:

a high molecular weight polyolefin having an inherent viscosity number of about 12–18 dL/g, wherein the inherent viscosity is determined by the use of a Cannon-Ubbelohde four bulb shear dilution viscometer (0.1 g polymer /100 ml toluene at 25° C.), calculated for each of the four bulbs, then plotted as a function of shear rate to determine the inherent viscosity at a shear rate of 300 $sec^{-1}$; and a polar organic compound which is miscible with said hydrocarbon stream in which said paste is to be introduced and said polar organic compound is a nonsolvent with respect to said polyolefin.

17. The paste of claim 16, in which said polyolefin comprises from about 40 to 75 percent of said paste by weight.

18. The paste of claim 16, in which said polar organic compound is a polar organic compound containing five carbons or less selected from the group consisting of aldehydes, ketones, alcohols and carboxylic acids.

19. A polyolefin slurry having drag reducing characteristics resulting from a process comprising the steps of:

A) solution polymerizing an alpha-olefin in a nonpolar organic solvent to form a polyolefin solution;

B) introducing an extracting agent miscible with said nonpolar organic solvent into one end of an inner elongated zone, said inner zone containing a plurality of openings along the length of such zone, each opening containing a plurality of small passageways which communicate with an outer elongated zone;

C) passing said polyolefin solution into said outer elongated zone surrounding and spaced from said inner elongated zone to form an annulus, said outer zone being sealed to the inner elongated zone at each end thereof;

D) passing said polyolefin solution from said outer elongated zone through the small passageways of said inner zone to form strands of polymer in said inner elongated zone;

E) contacting the polyolefin solution with said extracting agent within said inner elongated zone and precipitating said polyolefin form solution;

F) recovering said precipitated polyolefin;

G) grinding said precipitated polyolefin to a desired size;

H) mixing said ground polyolefin with a polar organic solvent to form a paste;

I) adding said paste to water to form a slurry.

20. The slurry of claim 19, wherein said ground polyolefin comprises 40–75% by weight of the paste of step H.

21. The slurry of claim 19, wherein the polary organic solvent contains five carbons or less selected form the group consisting of aldehydes, ketones, alcohols and carboxylic acids.

22. The slurry of claim 21 in which said polar organic solvent is an alcohol.

23. The slurry of claim 19, additionally comprising at least one compound selected from the group consisting of surfactants, defoamers, thickeners and biocides.

* * * * *

REEXAMINATION CERTIFICATE (3528th)

United States Patent
[11] B1 5,376,697

Johnston et al.
[45] Certificate Issued Jun. 2, 1998

[54] DRAG REDUCERS FOR FLOWING HYDROCARBONS

[75] Inventors: Ray L. Johnston; Larry G. Fry, both of Ponco City, Okla.

[73] Assignee: Conoco Inc., Ponca City, Okla.

Reexamination Request:
No. 90/004,153, Feb. 22, 1996

Reexamination Certificate for:
Patent No.: 5,376,697
Issued: Dec. 27, 1994
Appl. No.: 81,495
Filed: Jun. 21, 1993

[51] Int. Cl.$^6$ .......... C10M 107/02; F17D 1/16; C08J 3/14; B05D 5/08
[52] U.S. Cl. .......... 523/175; 524/394; 524/444; 524/445; 524/451; 137/13; 523/204; 528/491; 528/493; 528/495; 528/501
[58] Field of Search .......... 523/175, 204; 528/491, 501

[56] References Cited

U.S. PATENT DOCUMENTS 4,510,304  4/1985  Hadermann .......... 528/481

OTHER PUBLICATIONS

Chemical Dictionary by Grant & Hackh's, Fifth Ed. p. 564, McGraw–Hill Book Company, N.Y., 1987.

*Primary Examiner*—Tae Yoon

[57] ABSTRACT

The present invention provides a process for precipitating a polyolefin from solution. The present invention also provides a polyolefin paste having drag reducing characteristics when dissolved in a flowing hydrocarbon stream and a method for making the drag reducing paste. Finally, the present invention provides a slurried drag reducer prepared from the paste for use in flowing hydrocarbon streams.

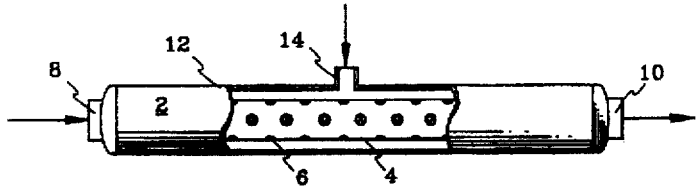

B1 5,376,697

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–15 and 19–23 is confirmed.

Claim 17 is cancelled.

Claim 16 is determined to be patentable as amended.

Claim 18, dependent on an amended claim, is determined to be patentable.

16. A polyolefin paste *containing from about 40 to about 75 percent by weight of polyolefin* having drag reducing characteristics when dissolved in a flowing hydrocarbon stream comprising:

a high molecular weight polyolefin having an inherent viscosity number of about 12–18 dL/g, wherein the inherent viscosity is determined by the use of a Cannon-Ubbelohde four bulb shear dilution viscometer (0.1 g polymer/100 ml toluene at 25° C.), calculated for each of the four bulbs, then plotted as a function of shear rate to determine the inherent viscosity at a shear rate of 300 $\text{sec}^{-1}$; and a polar organic compound which is miscible with said hydrocarbon stream in which said paste is to be introduced and said polar organic compound is a nonsolvent with respect to said polyolefin.

\* \* \* \* \*